(12) United States Patent
He et al.

(10) Patent No.: US 8,330,464 B2
(45) Date of Patent: Dec. 11, 2012

(54) DATA ACQUISITION METHOD WITH A THREE DIMENSIONAL SMALL BIN ELECTROMAGNETIC CONSECUTIVE ARRAY

(75) Inventors: Zhanxiang He, Zhuozhou (CN); Weibin Sun, Zhuozhou (CN); Yongtao Wang, Zhuozhou (CN); Deqiang Tao, Zhuozhou (CN); Zuzhi Hu, Zhuozhou (CN); Weifeng Luo, Zhuozhou (CN); Yue Zhang, Zhuozhou (CN)

(73) Assignees: China National Petroleum Corporation, Beijing (CN); BC-P Inc., China National Petroleum Corporation, Zhuozouh (CN)

( * ) Notice: Subject to any disclaimer, the term of this patent is extended or adjusted under 35 U.S.C. 154(b) by 240 days.

(21) Appl. No.: 12/924,268

(22) Filed: Sep. 22, 2010

(65) Prior Publication Data
US 2011/0037473 A1    Feb. 17, 2011

Related U.S. Application Data

(63) Continuation of application No. PCT/CN2009/000049, filed on Jan. 14, 2009.

(30) Foreign Application Priority Data

Apr. 10, 2008 (CN) .......................... 2008 1 0103695

(51) Int. Cl.
*G01V 3/08* (2006.01)
(52) U.S. Cl. .......................... 324/350; 324/348; 324/349
(58) Field of Classification Search .................. None
See application file for complete search history.

(56) References Cited

U.S. PATENT DOCUMENTS 4,862,089 A * 8/1989 Sigal .............................. 324/350
5,043,667 A * 8/1991 Schofield ....................... 324/350

OTHER PUBLICATIONS

Weibin et al., Deep structure study in complex area by 3D MT Data, Society of Exploration Geophysicists (SEG)/ 2007 Annual Meeting, San Antonio, TX, Oct. 2007, pp. 683-687.
Yu et al., Mapping Geothermal Reservoio Using Broadband 2-D MT Survey in Theistareykir, Iceland, 70th EAGE Conference, Rome, Italy, Jun. 9, 2008.
Smirnov et al., Broadband Magnetotelluric Instruments for Near-surface and Lithosperic Studies of Electrical Conductivity, Geophysica (2008), 44(1-2), 31-44.
International Search Report for PCT/CN2009/000049, Mar. 12, 2009.

\* cited by examiner

*Primary Examiner* — Reena Aurora
(74) *Attorney, Agent, or Firm* — Nold Intellectual Property Law; Charles R. Nold

(57) ABSTRACT

Disclosed herein is a three dimensional small bin electromagnetic consecutive array data acquisition method used in oil exploration comprising the steps of recording data using small bin lattices on execution of arrangement electrodes, each acquisition station ($E_x$, $E_y$) records the natural electromagnetic field time series data with the same acquisition parameter simultaneously; interference is removed first, for recorded data processing to get interference-free data; for border points and center point, the recording point serves as center point, and the same component from adjacent two points to total points area added together to obtain the average value of electric field data at time domain for each observation point; for corner points, the average values of the same electric field component from adjacent two points to total survey points toward bin direction is calculated; the electric field components acquired in maximum space serve as the new electric field values respectively; new time series data acquired in which the noise and the static shift effect have been suppressed, and apparent resistivity and phase curves of each point are acquired after processing with conventional method.

10 Claims, 4 Drawing Sheets

DATA ACQUISITION METHOD WITH A THREE DIMENSIONAL SMALL BIN ELECTROMAGNETIC CONSECUTIVE ARRAY

FIELD OF THE INVENTION

This application is a continuation of and claims priority under 35 U.S.C. §120 to International Application PCT/CN2009/000049 filed Jan. 14, 2009, which claims priority under 35 U.S.C. §365(c) to China CN 200810103695.0 filed Apr. 10, 2008.

The invention relates to a data acquisition method with a three dimensional small bin electromagnetic consecutive array which can effectively suppress and remove noise by means of a closed electric field and can remove static shift by planar space filtering on time series.

BACKGROUND OF THE INVENTION

Currently magnetotelluric methods are widely used in oil-gas, ore and groundwater resource exploration. To date the single-point sounding method (in one dimension) or the cross-section sounding method (in two dimensions) has been used. The one-dimensional acquisition method comprises the following steps for each survey point: 1) set an orthogonal electromagnetic field four-component receiving station (Ex, $E_y$, $H_x$, $H_y$), or a five-component receiving station ($E_x$, $E_y$, $H_x$, $H_y$, $H_z$) to acquire the time domain electromagnetic field continuously; 2) acquire a power spectrum of each field component by Fourier Transform of data in time domain indoor; 3) estimate impedance tensor by using the power spectrum; 4) and calculate apparent resistivity and phase difference. For a two-dimensional acquisition method at a survey station along a line, it is necessary to deploy a plurality of orthogonal electromagnetic field two-component (or four-component or five-component) receiving stations to record the time domain electromagnetic field continuously, while the data processing is the same as that of the single-point sounding method. The prior art method can achieve suitable results when applied to simple underground structures, such as one-dimensional or two-dimensional geological conditions. However, in the case of complex upper or underground structures, such as those in three dimensions, the above methods can not meet the requirements and solve geological problems with precision. It is hard to suppress and remove static shift effectively, so exploration results are significantly affected by the static shift, even to generate false structures. Also, it is difficult to suppress noise interference effectively, so data quality is affected. The above methods do not solve this problem either because only one magnetic station is placed on a relatively long array and the distance between the magnetic station and each survey point differs greatly, which is not practical in a zone in which the magnetic field varies significantly.

SUMMARY OF THE INVENTION

The present invention provides a data acquisition method with a three dimensional small bin electromagnetic consecutive array which can effectively suppress and remove noise by means of a closed electric field, and can remove static shift by planar space filtering on time series, thereby acquired data quality can be improved significantly. The present invention comprises the following steps:

(1) Electrodes are arranged in the form of a small bin lattice in a working area. A two-component electric field acquisition station ($E_x$, $E_y$) is deployed at the center of a small bin. Electrodes of the electric field component are arranged in an "L" shape of the conventional electrode-arrangement mode for corner points, and a "T" shape of the conventional electrode-arrangement mode for border points, and a "+" shape of the conventional electrode-arranging mode for center points; a two-component orthogonal horizontal magnetic fields ($H_x$, $H_y$) or a three-component orthogonal magnetic fields ($H_x$, $H_y$, $H_z$) acquisition station is deployed at the center point of the smallest bin, wherein the directions of $H_z$ and $H_y$ are parallel to those of the electric field components.

In step (1), in the small bin lattice acquisition method, each small bin is in the unit of 2×2, 3×3, 4×4 or 5×5 points.

In step (1), a unit bin of 2×2 points is referred to as the smallest bin.

In step (1), a unit bin of 3×3 points is divided into four smaller bins.

In step (1), a unit bin of 4×4 points is divided into nine smaller bins.

In step (1), the corner points and border points of the small bin and the center point of the connection line connecting each two adjacent survey points are the grounded points of receiving electrodes (M, N) as well as common electrodes of the adjacent survey points, and no electrode is arranged at the center point. In step (1), each two adjacent survey points of a small bin are connected by a common electrode, since the inner potential difference of the small bin is closed; the sum of the potential differences recorded by the acquisition station at any time is equal to zero.

In step (1), the distance between the respective survey points of the smallest bin and the magnetic station is equal to 0.5 L or 0.707 L, where L is the side length of the smallest bin.

(2) When recording data, each acquisition station records time series data of the natural electromagnetic field with the same acquisition parameters simultaneously, and a sampling rate is set according to acquisition frequencies.

In step (2), the high frequency range of the sampling rate applies a high sampling rate to obtain a relatively shorter acquiring time period, the medium frequency range applies a medium sampling rate, and the low frequency range applies a low sampling rate to obtain a relatively longer acquisition time period.

(3) The recorded data is processed to remove interferences and recorded data is acquired without interferences.

In step (3), the interference—removing processing is a space-closed adjustment processing of data at any time, which comprises the following steps: 1) assigning a data error in each closed loop to each survey point within the closed loop; 2) adjusting the small loop within each smallest bin; 3) identifying the interference data, and 4) calculating observation data without interferences by using the closed loop principle for potential fields.

Step (3) also comprises an interference removing process comprising noting if the closing error is greater than a prescribed minimum tolerance value when the whole closed loop at a certain time is interfered and the closing error is greater than a prescribed minimum tolerance value, the data recorded at this time would be deleted, then the outmost loop of the small bin is adjusted, and observation data without interference can be acquired after adjustment.

In step (3), the observation data without interference means that the closing error of any loop is smaller than the specified minimum tolerance value.

(4) When considering the border points and the center point, using the recording point as the center point, adding the same component from adjacent two points to total points to the value of a points to obtain the average value of time domain electric field data of all survey points; for the corner points, calculating the average value of the same electric field component from adjacent two points to total survey points toward a bin direction; using the electric field components acquired in the maximum space as new electric field values.

In step (4), said "adjacent two points to total points" means two points to all the electric field recording points on both sides of a straight survey line.

In step (4), said "adjacent two points to total survey points toward the bin direction for corner points" means two points to all the electric field recording points on one side of a straight survey line.

(5) After the observation fields are processed with the previous steps to obtain a new time series data where the noise and the static shift effect have been suppressed, then the apparent resistivity and phase curves of each point are acquired by processing the acquired new time series data with a conventional method.

In step (5), said conventional method means calculating a power spectrum and impedance tensor to obtain the apparent resistivity and phase curves and other calculated results of each point, wherein the magnetic field components share the same magnetic field as that of the center point.

In step (5), said conventional method means executing the power spectrum analysis and impedance tensor estimation for the time series data with a different electrode distance for each survey point to obtain a sequence of topology apparent resistivity observation curves from the same recording point.

In step (5), said conventional method is referred to as drawing frequency-apparent resistivity curves of different electrode distance of the same survey point on a log-log coordinate, and comparing the variation rule of the resistivity curves to analyze whether said curves are affected by the static shift: the apparent resistivity curve acquired by the electric field with the largest electrode distance is least affected by the static shift; if all curves are coincident with the apparent resistivity curve of the largest electrode distance, there is no static shift; and if the curves of a smaller electrode distance are offset relative to the curves of the largest electrode distance, there is a static shift. Generally speaking, the larger the offset, the greater the static shift causes.

DETAILED DESCRIPTION OF THE PREFERRED EMBODIMENTS

The detailed steps of the present application will be described in accompany with the drawings.

Step (1): applying small bin lattice data acquisition on execution of arranged electrodes in a working area Each small bin is in the unit of 2×2, 3×3, 4×4 or 5×5 points.

Figure 1:
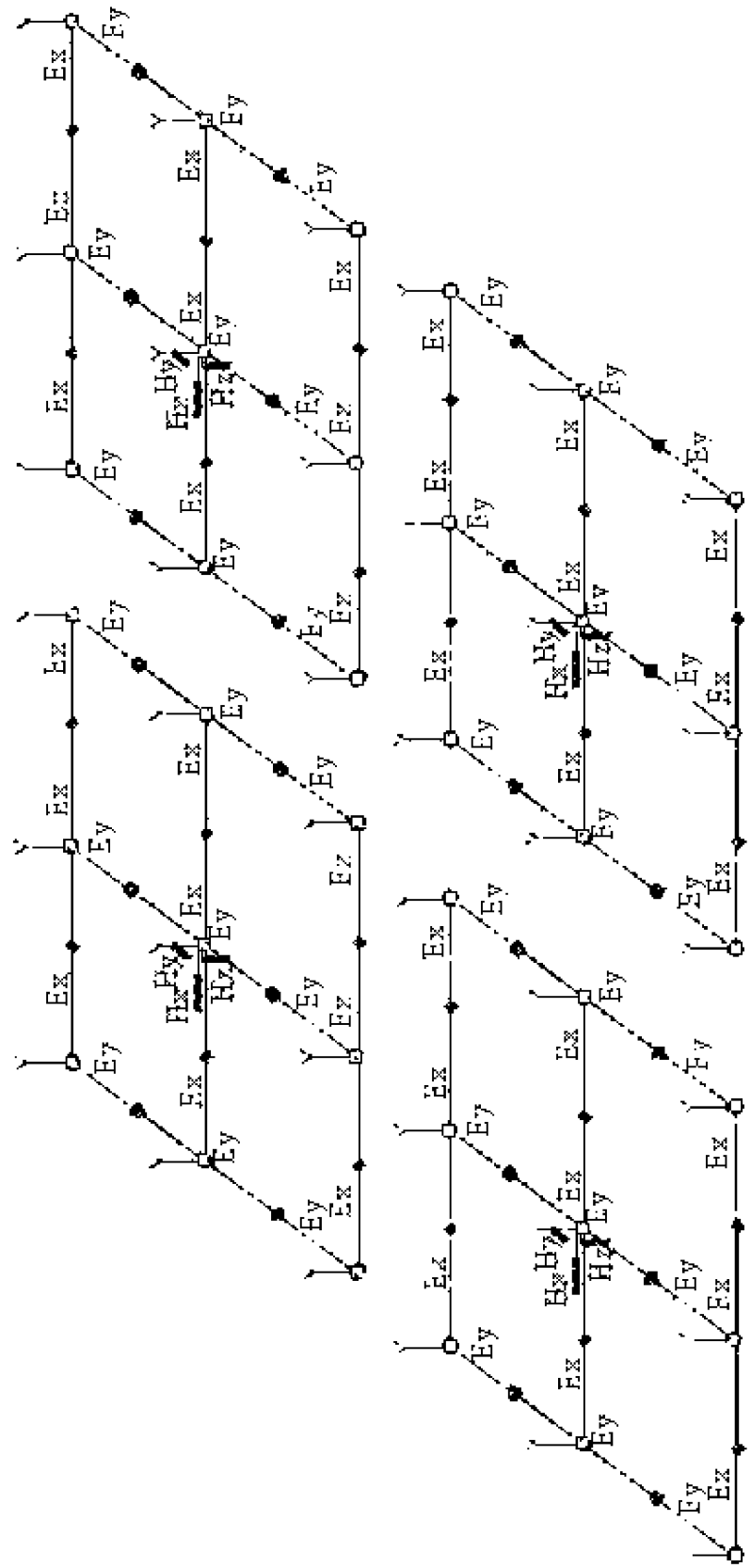
FIG. 1 is a schematic diagram showing the data acquisition setting of small bins according to the present invention.

According to the number of instruments, each smallest bin unit (2×2) is arranged with a two-component or three-component electromagnetic acquisition station at the center, a bin of 3×3 points can be divided into four smallest bins, a bin of 4×4 points can be divided into nine smallest bins, and border points and corner points of the small bins are not equipped with a magnetic field acquisition station (shown in FIG. 1).

Figure 2:
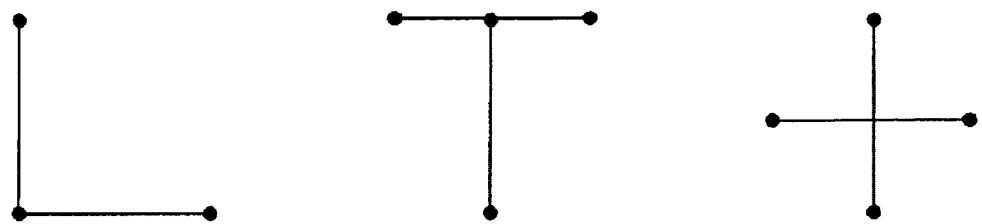
FIG. 2 is a schematic diagram showing "L", "T" and "+" electrode-arrangement mode in acquisition according to the present invention.
Figure 3:
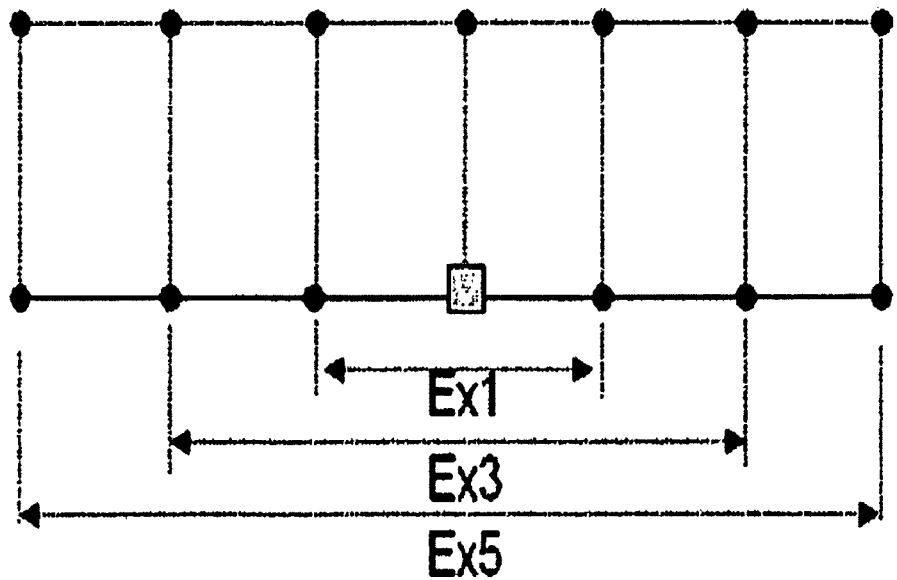
FIG. 3 is a schematic diagram showing calculation of electric fields of a border and a center point in the same direction.
Figure 4:
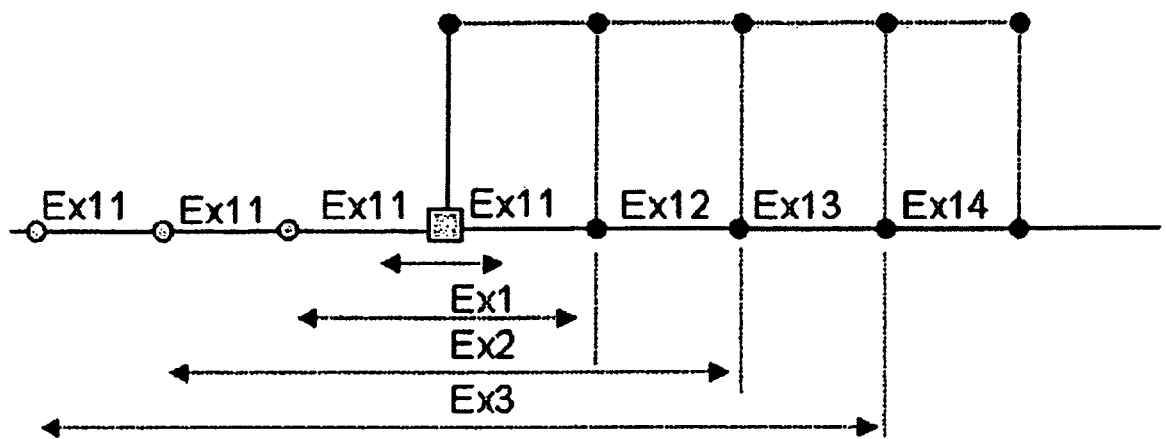
FIG. 4 is a schematic diagram showing calculation of electric fields of the a corner point and s border point in the same direction.

A rule for arranging electrodes for electric field components is as follows: an "L" shape of the conventional electrode-arrangement mode is used for corner points, a "T" shape of the conventional electrode-arrangement mode is used for border points, and a "+" shape of the conventional electrode-arrangement mode is used for the center point (shown in FIG. 2). The corner points, border points, and the center point of the connection line connecting each two adjacent survey points are the grounded points of the receiving electrodes (M, N) as well as the common electrodes of the adjacent survey points, and no electrode is arranged at the center point. Therefore, each two adjacent survey points of the small bin are connect by the common electrode, since the inner potential difference of the small bin can be closed, the sum of the potential differences recorded by the acquisition station inside the small bin at any time and in any closed loop is equal to zero.

The arrangement of the electrodes for magnetic field components comprises two-component orthogonal horizontal magnetic fields ($H_x$, $H_y$) or a three-component orthogonal magnetic fields ($H_x$, $H_y$, $H_z$) magnetic bar is arranged at the center point of the smallest bin, wherein the directions of $H_x$ and $H_y$ are parallel to those of the electric field components, respectively. The distance between the respective survey points of the small bin and the magnetic station does not differ greatly, which is 0.5 L or 0.707 L, where L is the side length of the smallest bin.

Step (2): Recording Data

After a small bin is deployed, each acquisition station records data with the same acquisition parameters simultaneously to get time series data of the natural electromagnetic field as the conventional method, wherein the sampling rate can be set to the following three kinds: in the high frequency range, a higher sampling rate is used to shorten the acquisition time period, in the medium frequency range, a medium sampling rate is used, and in the low frequency range, a lower sampling rate is used.

Step (3): Performing Interference—Removal Processing Indoor

Data at any time is processed by a space-closed adjustment which comprises the following steps: 1) assigning data error in each closed loop to the respective survey point; 2) conducting an adjustment in each small loop; 3) identify interference data, and calculate data without interference using the closed loop principle for potential fields. If the adjustment value is smaller than a certain tolerance value, it is deemed that acquired data is of no interference; however if the adjustment value is greater than the tolerance value, then there is interference in the whole closed-loop, so the data recorded at this time are deleted. After the outmost loop of the small bin is adjusted, a set of new observation data can be acquired.

Step (4): Conducting Static Shift-Removal Processing

The newly acquired time series data by the above interference removal process are further processed. For the border points and the center point, the recording point is used as the center point and the same component from the adjacent two points, three points, or four points are added to the total points to obtain the average value of the time domain electric field data of all survey points. For the corner points, the average value of the same component of the adjacent two points or three points is calculated to add to the total points toward the bin direction and the electric field components acquired in the largest space distance are used as new electric field values, respectively. Such processing comprises filtering static shift effects at a high frequency segment in the spatial domain.

The power spectrum analysis and impedance tensor estimate are conducted for data acquired using different electrode distance of each survey point to obtain a sequence of topology apparent resistivity curves from the same recording point. The apparent resistivity curves with different electrode distance of the same survey point are drawn on a log-log coordinate; variation rules of different resistivity curves are analyzed to determine the affected range of static shift. In general, the apparent resistivity curve acquired by the electric field with the largest electrode distance is the least affected by the static shift effect. If all curves are coincident with the apparent resistivity curve with the largest electrode distance, there is no static shift. If the curves with smaller electrode distance are offset relative to the curve with the largest electrode distance, there is static shift. In general, the larger the offset, the greater the static shift effect will be.

Step (5): For the newly acquired time series data acquired after the processing of the above steps, power spectrum and impedance tensor are calculated using a conventional method to obtain the apparent resistivity, phase curves and other calculated results of each point, wherein the magnetic field components share the same magnetic field as that of the center point. The new calculated results are noise-free and static shift effect—suppressed, thus the data acquisition quality in an area where EM data featuring serious noise interference and static shift is improved significantly.

Figure 5:
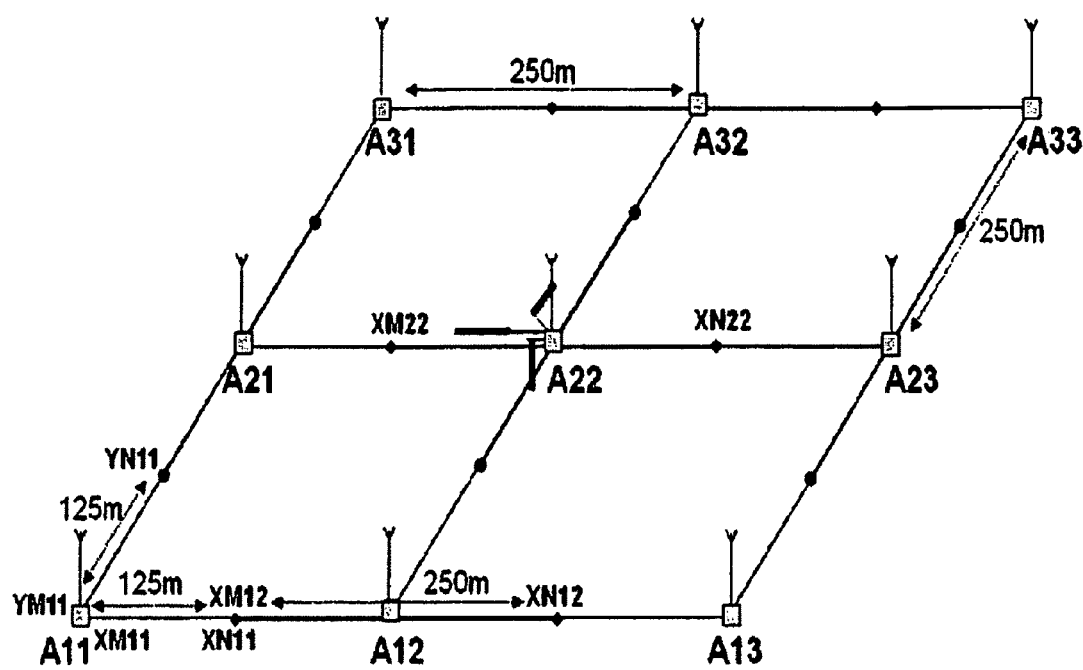
FIG. 5 is a schematic diagram showing a small bin A of 3×3 points.

With reference to FIG. 1 and FIG. 5 shows an embodiment of the present invention where a 3×3 small bin lattice data acquisition on execution of arranged electrodes in a working area. A three dimensional EM consecutive array exploration is done upon 36 electric field acquisition stations 120 and 16 magnetic field acquisition stations, an acquisition lattice with 4 small bins is arranged, and each small bin comprises 3×3 points. The lattice has a size of 250×250 m. The A bin lattice nodes (i.e. survey points) are numbered as A11, A12, A13; A21, A22, A23; A31, A32, A33 (shown in FIG. 5). Similarly, B, C and D bin lattices are numbered in the same way. A11, A31, A13 and A33 are corner points, electrode distances of both $E_x$ and $E_y$ are 125 m. For example, for the corner point A11 in an "L" electrode-arrangement mode, electric dipoles of Ex are XM11-XN11, wherein XM11 is located at point A11 and XN11 is located at the center point between A11 and A12; and electric dipoles of $E_y$ are YM11-YN11, wherein YM11 is located at point A11 and YN11 is located at the center point between A11 and A21; other points may be arranged in a similar way. A12, A21, A23 and A32 are border points deployed in a "T" electrode-arrangement mode, the electric dipoles along the border have a length of 250 m, and the electric dipoles that face inside of a bin have a length of 125 m. For example, for the border point A12, electric dipoles of Ex are XM21-XN21, wherein XM21 has a common electrode with XN11 of point A11, and XN21 has a common electrode with XM13 of point A13, other points may be arranged in a similar way. A22 is the center point deployed in a "+" electrode-arrangement mode, electric dipole distances of both $E_x$ and $E_y$ are 250 m.: The electric dipoles of $E_x$ are XM22-XN22, wherein XM22 is the center point between A21 and A22, and XN22 is the center point between A22 and A23. The electric dipoles of $E_y$ are YM22-YN22, wherein YM22 is the center point between A12 and A22, YN22 is the center point between A22 and A32, and the center point A22 is equipped with orthogonal horizontal magnetic fields $H_x$ and $H_y$.

(2) Data recording: when recording data, each acquisition station records time series data of the natural electromagnetic field with the same acquisition parameters simultaneously, and a sampling rate can be set according to frequency ranges. After A, B, C and D small bins are arranged; three sampling rates are set in the following way. In the high frequency range, a high sampling rate is used to obtain a shorter recording time period; in the medium frequency range, a medium sampling rate is used, and in the low frequency range, a low sampling rate is used. Each acquisition station records time series data of the natural electromagnetic field simultaneously.

(3) Interference—removal processing is conducted over the recorded data to obtain interference-free data: the time series data is first extracted indoor, and the recorded data of the same time in each small bin is then adjusted to make closing error of each small bin is zero. It is provided that the minimum tolerance adjustment value is $\epsilon$, firstly a closed adjustment is conducted in the smallest loop such as loop A11-A12-A22-A21-A11, then 8 potential differences, namely a potential difference V11X of point A11 in X direction, half potential difference V12X of point A12 in X direction, a potential difference V12Y of point A12 in Y direction, half potential difference V22Y of point A22 in Y direction, half potential difference V22X of point A22 in X direction, a potential difference V21X of point A21 in X direction, half potential difference V21Y of point A21 in Y direction, and a potential difference V11Y of point A11 in Y direction, are added together:

$$DV=V11X+V12X+V12Y+V22Y+V22X+V21X+V21Y+V11Y$$

If the measurement precision is very high, then $|DV|<\pm\epsilon$. However, the actual recorded data are not likely equal to zero due to various interferences. Therefore, it is necessary to perform adjustment and to assign the error to each path evenly.

So, $V11X0=V11X+DV/8$, $V12X0=V12X+DV/8$ $V21X0=V21X+DV/8$, $V22X0=V22X+DV/8$ $V11Y0=V11Y+DV/8$, $V12Y0=V12Y+DV/8$ $V21Y0=V21Y+DV/8$, $V22Y0=V22Y+DV/8$

After each time series data are adjusted, the adjusted time series data of the first loop are acquired. Similarly, other closed loops in the small bin can be adjusted. If the calculated sum value is too large (greater than $\epsilon$, wherein $\epsilon$ is the tolerance value of the potential difference of the closed loops), which means strong interference exists at this time, then it is analyzed from which path the interference comes mainly, and values of other paths within the same closed loop are used to calculate the value of the said path which cause a large potential difference. If the data of all paths within a closed loop offsets notably, the data at this time need to be deleted directly. Adjustments of other closed loops are executed in turn, wherein adjustments of the common borders and common nodes can be calculated together, for example, the electric field $E_x$ of the center point is the sum of the originally recorded value plus all adjustment values of each closed loop. Finally, the closed error of the outer loop of the small bin is calculated to check the adjustment effect. After the adjustment, a new set of time series data is acquired. The apparent resistivity and phase curves of each point acquired by calculating the electromagnetic field power spectrum and impedance tensor of each survey point can be compared with the original curves.

(4) For the border points and the center point, the recording point is used as the center point, the same component from the adjacent two points is added to the value of a point to obtain the average value of time domain electric field data of all survey points; and the new time series data acquired after adjustment is processed. for example, for the data of electric field Ex of the border point A12, the electric field average value $E_x12-3=(E11+E12+E13)/3$ of three points A11, A12 and A13 is calculated to serve as the electric field value of point A12, and for the electric field $E_x$ of the center point A22, the electric field average value Ex22–3=(E21+E22+E23)/3 of three points A21, A22 and A23 is calculated to serve as the electric field value of point A22; for the corner points, the average value of the same electric field component from the adjacent two points to total survey points is calculated toward the bin direction; for example, for the electric field Ex of the corner point A11, the electric field average values $E_x11-12=(3E11+E12)/4$ and $E_x11-13=(4E11+E12+E13)/6$ of A11, A12 and A11, A12, A13 are calculated to serve as the electric field value of point A11, and so on. Therefore a set of new electric field values of each survey point from small electrode distance to large electrode distance can be acquired and the electric field value with the calculated largest electrode distance can serve as a new electric field observation value.

In order to obtain static shift of certain points, the power spectrum and a series of topology apparent resistivity and phase curves of this point can be calculated with the above power spectrum calculation method. Apparent resistivity curves with different electrode distances from the same survey point are drawn on a log-log coordinate, for example, 3 apparent resistivity curves of point A11 are used to analyze the variation rule of the apparent resistivity curves, if these 3 curves are coincident, there is no static shift; if the curves with a smaller electrode distance are significantly higher or lower than curves with a larger electrode distance, there is static displace effect.

(5) Processing the new time series data with a conventional method. The noise and static shift in the new time series data are suppressed after noise-removal adjustment at time domain and filtering at spatial domain to obtain new sections of apparent resistivity and phase curves with increased precision and reliability.

The invention claimed is:

1. A three-dimensional small bin electromagnetic consecutive array data acquisition method comprising the following steps:
   (1) applying small bin lattice data acquisition on execution of arrangement electrodes in a working area, arranging a two-component electric field acquisition station ($E_x$, $E_y$) at the center of a small bin, in said small bin lattice acquisition, an "L" electrode-arrangement mode of a conventional method is used for corner points, a "T" electrode-arrangement mode of a conventional method is used for border points, and a "+" electrode-arrangement mode of a conventional method is used for a center point; arranging a two-component orthogonal horizontal magnetic field ($H_x$, $H_y$) magnetic bar or a three-component orthogonal magnetic fields ($H_x$, $H_y$, $H_z$) magnetic bar at the center point of the smallest bin, wherein the directions of $H_x$ and $H_y$ are parallel to those of the electric field components;
   (2) acquiring data, wherein each acquisition station records natural electromagnetic field time series data with the same acquisition parameters simultaneously, and a sampling rate being set upon frequency;
   (3) interference is first removed during data processing to obtain interference-free data;
   (4) for the border points and center point, the recording point serves as the center point, adding the same component from the adjacent two points to total points respectively to obtain the average value of time domain electric field data of all survey points; for the corner points, calculate the average values of the same electric field component from the adjacent two points to the total survey points toward a bin direction; us the electric field components acquired in the maximum space as new electric field values;
   (5) after the observation field values are processed with the above steps, new time series data are acquired in which noise and static shift effect have been suppressed, and apparent resistivity and phase curves of each point can be acquired after processing with a conventional method.

2. The three-dimensional small bin electromagnetic consecutive array data acquisition method according to claim 1, further comprising, in step (1), in said small bin lattice acquisition, each small bin is chosen from the group consisting of a unit of 2×2, 3×3, 4×4 or 5×5 points, wherein a unit bin of 3×3 points is divided into four smaller bins, and a unit bin of 4×4 points is divided into nine smaller bins.

3. The three-dimensional small bin electromagnetic consecutive array data acquisition method according to claim 1, further comprising, in step (1), the corner points and border points of the small bin and the center point of the connection line between each two adjacent survey points are grounded points of receiving electrodes (M, N), also common electrodes of the adjacent survey points, and no electrode is used for the center point.

4. The three-dimensional small bin electromagnetic consecutive array data acquisition method according to claim 1, further comprising, in step (1), each two adjacent survey points of the small bin are connected by the same common electrode, and the inner potential difference of the entire small bin is closed and the sum of the potential differences recorded by the acquisition station at any time is equal to zero.

5. The three-dimensional small bin electromagnetic consecutive array data acquisition method according to claim 1, further comprising, in step (1), the distance between the survey points and the magnetic field acquisition station in the smallest bin is 0.5 L or 0.707 L, where L is the side length of the smallest bin.

6. The three-dimensional small bin electromagnetic consecutive array data acquisition method according to claim 1, further comprising, in step (2), the high frequency range of the sampling rate uses a high sampling rate to obtain a shorter acquisition time period, the medium frequency range uses a medium sampling rate, and the low frequency range uses a low sampling rate to obtain a longer acquisition time period.

7. The three-dimensional small bin electromagnetic consecutive array data acquisition method according to claim 1, further comprising, in step (3), the interference removal processing comprises the following steps: 1) assigning a data error in each closed loop to the respective survey points; 2) first adjust the small loop inside of each of the smallest bin; 3) identify interference data, and obtain interference-free data by using the closed loop principle for potential fields; wherein, if the whole closed loop at some time is has interference and the closing error is greater than a specified minimum tolerance value, the data at this time is deleted, and the outmost loop of the small bin is then adjusted, thus acquiring interference-free data.

8. The three-dimensional small bin electromagnetic consecutive array data acquisition method according to claim 1 wherein in step (3), said data without interference means the closing error of any loop is smaller than the specified minimum tolerance value.

9. The three-dimensional small bin electromagnetic consecutive array data acquisition method according to claim 1, wherein, in step (4), said adjacent two points to total points comprises two points to all the electric field record points on both sides of a straight survey line, and the adjacent two points to total survey points toward a bin direction for corner points comprises two points to all the electric field record points on one side of the straight survey line.

10. The three-dimensional small bin electromagnetic consecutive array data acquisition method according to claim 1, wherein, in step (5), said conventional method comprises steps: 1) calculating a power spectrum and impedance tensor to obtain the apparent resistivity and phase curves and other calculated results of each point, wherein the magnetic field components of the respective survey points of the smallest bin share the same magnetic field as that of the center point; 2) conduct a power spectrum analysis and impedance tensor estimate on the time series data for each survey point with different lengths of electrode distance to obtain a sequence of topology apparent resistivity curves of the same record point; 3) drawing frequency-apparent resistivity curves with different electrode distances of the same survey point on a log-log logarithmic coordinate, and 4) comparing the variation rules of the curves to analyze whether said curves are affected by the static shift: the apparent resistivity curve acquired by the electric field with the largest electrode distance is the representative of the minimum static shift effect, wherein if all curves are coincident with the apparent resistivity curve with the largest electrode distance, there is no static shift, and if curves of a relatively smaller electrode distance are offset relative to the curve of the largest electrode distance, there is static shift; in general, the larger the offset, the greater the static shift effect.

* * * * *

UNITED STATES PATENT AND TRADEMARK OFFICE
CERTIFICATE OF CORRECTION

PATENT NO. : 8,330,464 B2  
APPLICATION NO. : 12/924268  
DATED : December 11, 2012  
INVENTOR(S) : Zhanxiang He et al.

Page 1 of 1

It is certified that error appears in the above-identified patent and that said Letters Patent is hereby corrected as shown below:

On the title page item (73), "BC-P Inc., China National Petroleum Corporation" should be changed to --BGP Inc., China National Petroleum Corporation--.

Signed and Sealed this  
Thirtieth Day of April, 2013

Teresa Stanek Rea  
*Acting Director of the United States Patent and Trademark Office*